(12) United States Patent
Linbeck, III et al.

(10) Patent No.: US 11,327,087 B2
(45) Date of Patent: May 10, 2022

(54) AUTOMATED DRIVING OF AN ASSAY WITH SPACED MAGNETS

(71) Applicant: BreviTest Technologies, LLC, Houston, TX (US)

(72) Inventors: Leo Linbeck, III, Houston, TX (US); Javier Trinidad Garza, Jr., Laredo, TX (US); Robert Patrick Garr, Fair Oaks Ranch, TX (US); Dev Chatterjee, Saint Louis, MO (US)

(73) Assignee: BREVITEST TECHNOLOGIES, LLC, Houston, TX (US)

( * ) Notice: Subject to any disclaimer, the term of this patent is extended or adjusted under 35 U.S.C. 154(b) by 111 days.

(21) Appl. No.: 16/846,684

(22) Filed: Apr. 13, 2020

(65) Prior Publication Data

US 2021/0318342 A1    Oct. 14, 2021

(51) Int. Cl.
*G01N 35/00* (2006.01)

(52) U.S. Cl.
CPC ............ *G01N 35/0098* (2013.01); *G01N 35/00871* (2013.01); *G01N 2035/00534* (2013.01)

(58) Field of Classification Search
CPC ......... G01N 35/00871; G01N 35/0098; G01N 2035/00564; G01N 2035/00534
See application file for complete search history.

(56) References Cited

U.S. PATENT DOCUMENTS

| | | | | |
|---|---|---|---|---|
| 2010/0284864 | A1* | 11/2010 | Holenstein | B01L 9/543 210/695 |
| 2011/0199080 | A1* | 8/2011 | Ovsyanko | G01R 33/1269 324/253 |
| 2014/0021105 | A1* | 1/2014 | Lee | B03C 1/02 209/214 |
| 2016/0146798 | A1* | 5/2016 | Donolato | G01N 33/54373 435/7.1 |
| 2016/0153974 | A1* | 6/2016 | Donolato | G01N 33/54326 422/69 |
| 2016/0289665 | A1* | 10/2016 | Mao | G01N 35/00584 |
| 2017/0247682 | A1* | 8/2017 | Sakai | C12N 15/1013 |
| 2018/0111128 | A1* | 4/2018 | Chatterjee | G01N 33/54333 |

* cited by examiner

*Primary Examiner* — Shogo Sasaki
(74) *Attorney, Agent, or Firm* — Eric P. Mirabel

(57) ABSTRACT

The invention herein relates to conducting assays with an apparatus including a substantially transparent assay cartridge loaded with magnetic beads, and a magnets positioned in a platform above and below the assay cartridge. The assay cartridge includes magnetic beads, sample and control solutions in some wells, and assay reagents in others. A microcomputer controls a linear actuator which moves the magnet platform causing the magnetic beads to travel from one well to another and to oscillate within a well. At assay completion, the cartridge will generate a signal representing a test result, which is then sent to a server through a wireless transmission system.

18 Claims, 20 Drawing Sheets
(1 of 20 Drawing Sheet(s) Filed in Color)

AUTOMATED DRIVING OF AN ASSAY WITH SPACED MAGNETS

BACKGROUND

A reliable, robust, easy-to-use assay system which can be deployed at a point of care is useful in a number of settings. For example, where there is an infectious disease outbreak in a remote area (e.g., the recent Covid-19 or Ebola virus outbreaks), such an assay is beneficial for arresting the outbreak as quickly as possible (infected individuals can be quickly identified and then given medical care) and for keeping health care providers safer.

An assay driver system can be used to automate an assay. One type of assay driver induces movement of magnetic beads conjugated with a binding agent which contacts a target analyte in the sample (or control) and then carries the analyte into contact with reagents. The movement has to be carefully timed, to ensure proper reaction times for different reagents. The results must also be readable for fast interpretation.

Prior point of care assay systems include those disclosed in U.S. Pat. Nos. 9,528,985; 10,252,268; and 10,126,297 (all incorporated by reference). These patents all disclose cartridges having wells containing various assay reagents. Magnetic beads made to bind to the target analyte also reside in the wells, and the magnetic beads are moved among the wells in order to carry an analyte (whether in a sample or in a fixed-concentration solution) into contact with different assay reagents in different wells.

An assay driver system can be used to automate the assay, by moving magnets (and carrying the magnetic beads) through the wells of the cartridge, and into contact with the assay reagents in various wells. The movement has to be carefully timed, to ensure proper reaction times for different reagents. The results must also be read and sent for interpretation, to permit quick action. The sample, fixed concentration analyte solution, magnetic beads, and reagents can be combined into a single cartridge for use in the assay. Remote authentication of the cartridge allows transmission of the appropriate instructions to the driver, allowing for automation of the assay performed on the cartridge, together with reading and sending of assay results at the point of care, can allow quick evaluation of patient condition by monitoring different analytes of interest; including infectious agents.

The previous assay systems described in U.S. Pat. Nos. 9,528,985; 10,252,268; and 10,126,297 employed a series of wells for sample and another series of wells designed to house a control. The cartridges also had to be sealed on the lower side with a removable Parafilm cover layer at the time of conducting the assay. It is desirable to provide an improved cartridge, where a lower-facing added Parafilm cover layer is not used. An improved cartridge may also include an additional row of wells, which additional wells can be used as an additional sample or control. The improved cartridge should be suitable for shipping with reagents and/or magnetic beads pre-loaded in wells, and without substantial risk of loss of reagent from the wells during shipment.

The position and type of magnets which move the magnetic beads through the channels in the cartridge, and which mix the magnetic beads with the contents of the wells, is critical to the magnetic bead motion and thereby to provide improved bead movement and mixing of beads with reagents in wells. The improved cartridges, therefore, need to be matched with an automated assay driver system with properly positioned magnets to increase assay reliability, efficiency and facilitate faster interpretation of assay results.

SUMMARY

The invention is an apparatus and method for performing an assay where a sample or fixed concentration of antigen is carried by magnetic beads conjugated to one or more binding agents, and thereby brought in contact with different assay reagents in different wells of an assay cartridge. The movement of magnetic beads among wells of the cartridge is driven and guided by controlled movement of magnets or a magnetic array, preferably including an upper set of preferably cylindrical magnets above the cartridge and a lower set of preferably spherical magnets below the cartridge, where the two sets of magnets are co-axially aligned and remain so aligned as they move. The magnets are preferably permanent magnets, such as rare earth magnets, though other means of generating magnetic force, including electromagnets, and including magnets with other shapes and arrangements, could be used. The movement of the magnets is controlled by an apparatus in accordance with a set of authenticated assay instructions.

Both the upper and lower sets of magnets were determined to have a limit of optimum distance from the cartridge, at which the ability of the magnetic force to move virtually all of the magnetic beads through the wells and oscillate them to provide adequate mixing shows significant decline.

The preferred assay cartridge is substantially transparent, and is formed of two layers (an upper layer and a middle layer) of clear polymer, preferably acrylic, and two layers (a bottom layer and a cover layer) of thin clear polymer, preferably polyethylene. The wells and features in the cartridge are preferably laser cut. The upper layer includes a series of rectangular holes which reside above similarly-sized and shaped openings in the middle layer, where the rectangular openings in the middle layer act as channels between wells, and the openings in the middle layer act as air gaps between wells. The upper layer can also include holes for filling wells with reagents or magnetic beads or fixed concentrations of analyte. The cover layer includes one or more fill holes for adding samples to the cartridge. The middle layer also includes channels which connect some wells into a row of wells. A bottom layer is essentially an impervious sealing layer for one side of the wells and channels in the middle layer. The cover layer fits over the upper layer to help seal the wells during shipment. All layers preferably include registration holes for alignment during manufacturing, and the middle layer preferably includes adhesive on both sides to bond to one side of each of the lower and upper layers. The upper layer preferably includes adhesive on its upper side to bond to the cover layer.

The magnets are preferably moved longitudinally in same direction as the axes of the channels using a driving mechanism which moves both the upper and lower sets of magnets together. A magnetometer can be included to check the magnetic field strength at the wells.

The apparatus also includes optical sensors which can detect color change in one of the wells in each row in the assay cartridge. A set of LEDs is also preferably included for added illumination of the wells.

In a preferred apparatus embodiment, the upper set of magnets are carried by a bracket which lies above the cartridge and below the optical sensors during operation. Optionally, the optical sensors may be mounted directly on the bracket. The bracket is attached to a movable platform, which carries the lower set of magnets and the LEDs. The movable platform preferably includes a heating block for the cartridge, and is positioned below the cartridge. Also preferred is an IR sensor that can be used to measure the temperature of the cartridge, to help monitor and ensure proper reaction temperature is maintained.

The bracket preferably includes a slot which, when the bracket is positioned for reading assay results, allows the sensors an open line of sight to the cartridge wells used to generate a signal via color change and the LEDs being used for illumination.

The platform is preferably moved by linear actuator, such as a motor and a driving belt combination. Other means of moving the platform, such as manual manipulation, are also within the scope of the invention. The gears driving movement of the belt can intermittently rotate in both directions, to cause oscillation of the platform and the bracket, to mix the magnetic beads with sample(s), one or more fixed concentrations of analyte, or reagents by oscillating movement of the magnets on the platform which move the magnetic beads.

The assay cartridge preferably includes two or more rows of wells, where each row is arranged along a line parallel with the direction of motion of the platform and bracket. The wells are preferably less than 2 mm in depth, and more preferably, are 1.5 mm in depth.

In one embodiment, the cartridge has two or more rows of wells, where one row has a well with the sample, and magnetic beads, and assay reagents in other wells. The contents of the other row are identical to the first row except that a control consisting of a fixed concentration of the target analyte in solution is introduced into a well, in place of the sample. The preferred cartridge also has a third row of wells (adjacent the row with control) suitable for housing additional or different sample or control. Each well in each row of wells is connected to the other wells in the row through a channel.

Hydrogel is added to the wells to inhibit migration of reagents among wells and into channels during transport of a loaded assay cartridge. Preferably, a hydrogel is selected which is solid at room temperature and below (i.e., during shipment) but which is melted to liquefy the reagent solutions at the time of the assay. Preferred hydrogels for use in the invention include high Bloom at 1% concentration in phosphate-buffered saline, as such higher Bloom numbers were found to provide better control over melting and gelling points.

The platform (carrying the lower magnets) is positioned less than a specific distance below the cartridge, and the bracket (carrying the upper magnets) is positioned less than a specific distance above the cartridge, such that the magnetic beads in the cartridge experience a defined range of magnetic force (provided by the upper and lower magnets) which acts downwardly on them, in net.

To automate the movement of the platform and bracket (and their respective sets of magnets), the apparatus is further equipped with a microcomputer, which controls the operations of a driving motor which preferably drives the platform and bracket through use of a pulley and timing belt. The microcomputer is preferably positioned on a circuit board which resides above the bracket to allow for color sensors on the underside of the circuit board to read the result of the assay by detecting color changes in reagents in wells of the cartridge.

To conduct an assay, a loaded assay cartridge (preferably having a sample, control fixed concentration of analyte in solution, conjugated magnetic beads, and reagents loaded in wells) is placed in a defined slot (which preferably only admits the cartridge if properly oriented) in the apparatus. Based on a one-dimensional or two-dimensional barcode identifier applied to or embedded in the cartridge, the cartridge identity is determined, sent to a server, authenticated, and matched to a set of instructions appropriate to the assay being run on that cartridge. Those instructions are then sent to the device. The microcomputer uses the assay instructions to run the assay, including driving and guiding movement of the platform and bracket (which carry the sets of magnets), reading results, and sending those results to a server for analysis and storage. The magnetic beads follow movement of the platform and travel through wells and along the channels from one well to another to interact with different reagents, in performance of the assay. The microcomputer can instruct the linear actuator moving the magnetic beads to oscillate and thereby, oscillate magnetic beads within the wells to thoroughly mix them with the well contents.

Embodiments of the invention are discussed in greater detail with reference to the accompanying figures in the detailed description which follows.

BRIEF DESCRIPTION OF DRAWINGS

The patent or application file contains at least one drawing executed in color. Copies of this patent or patent application publication with color drawing(s) will be provided by the Office upon request and payment of the necessary fee.

Figure 1:
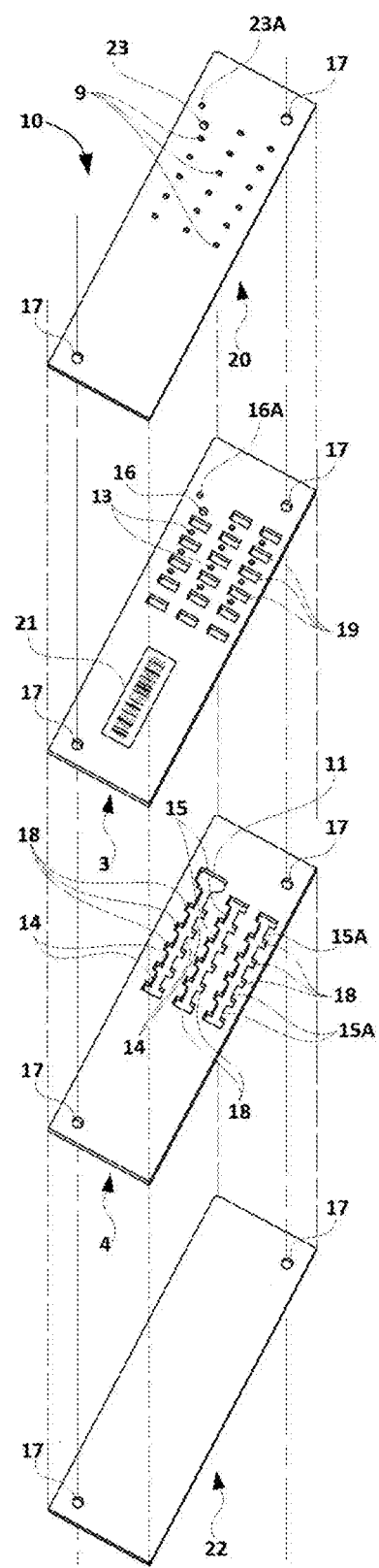
FIG. 1 illustrates an exploded view of the four layers forming the unfilled assay cartridge.
Figure 2:
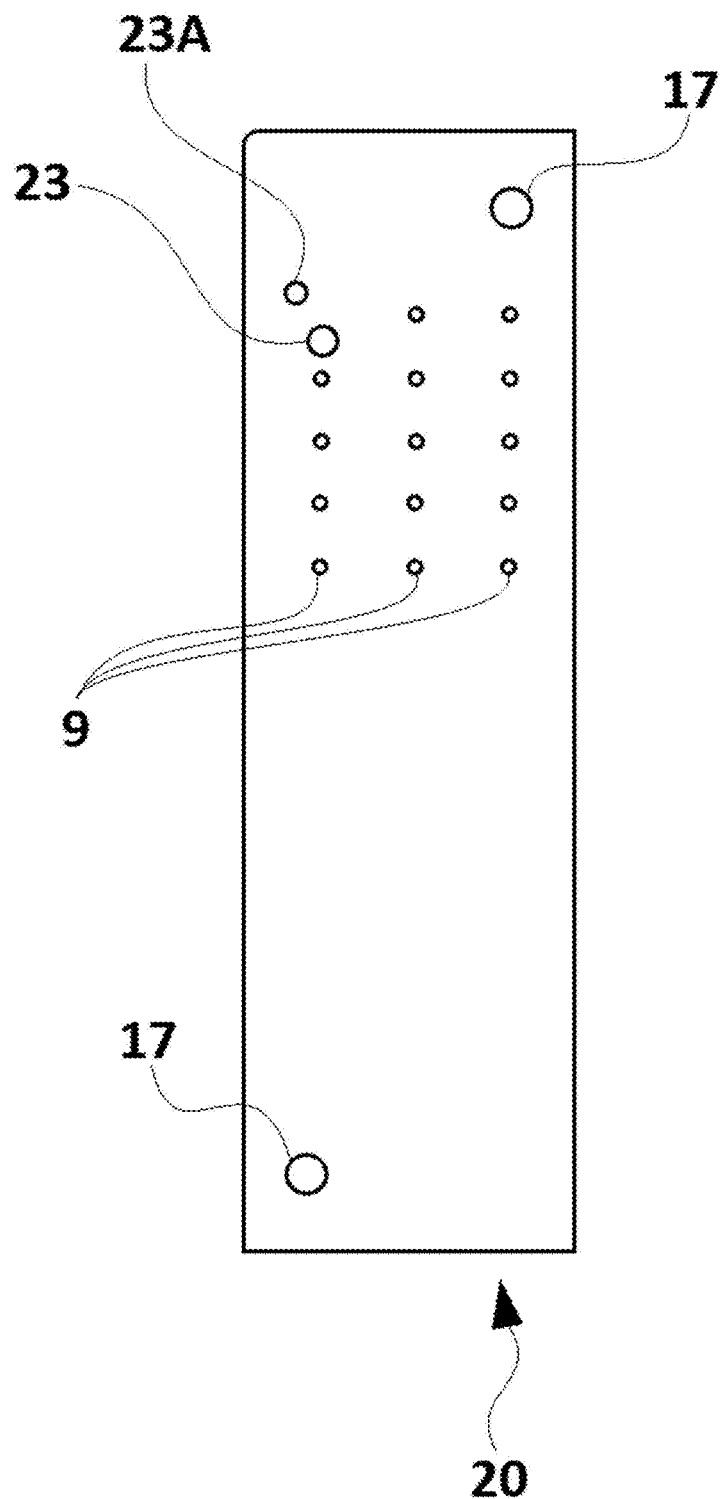
FIG. 2 is a plan view of the fourth layer or cover layer for the assay cartridge, showing its holes.
Figure 3:
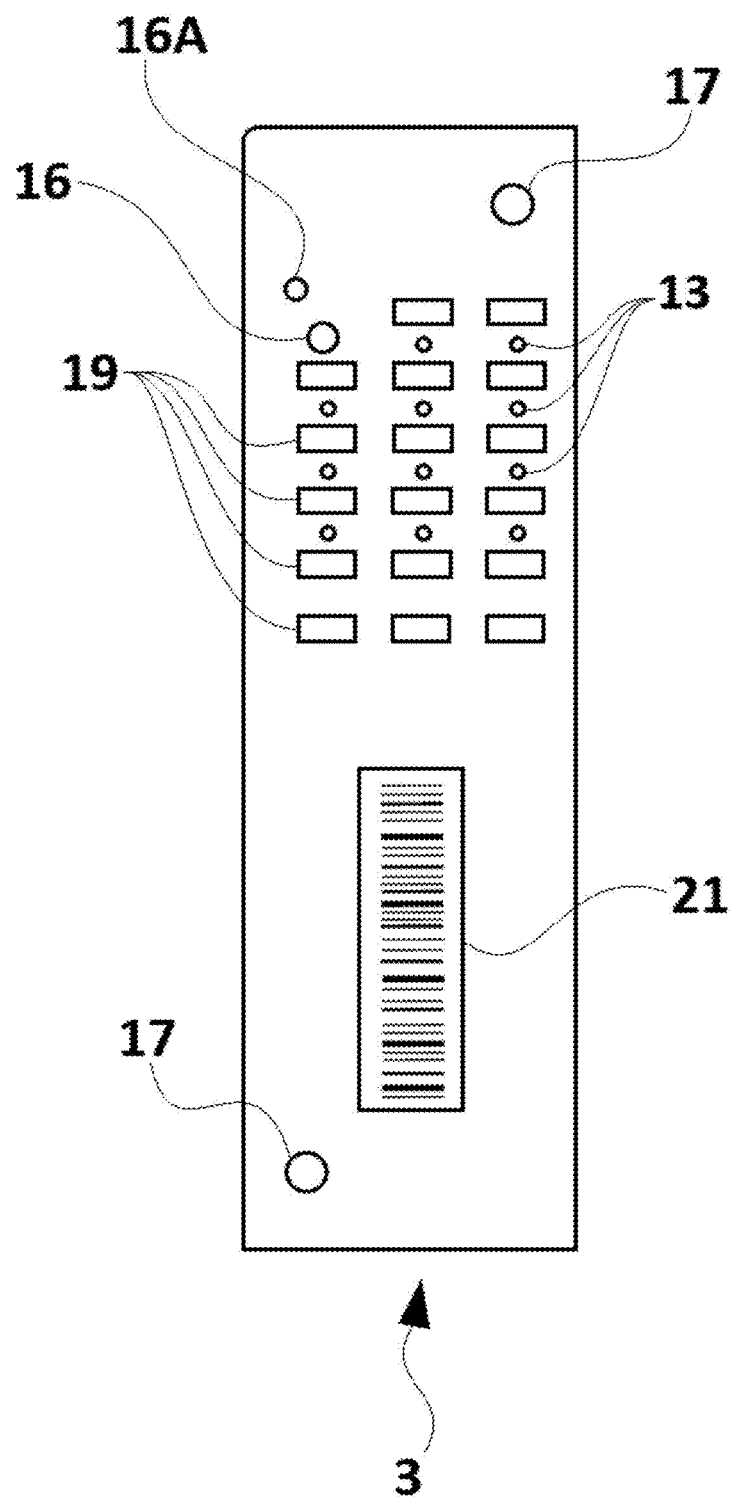
FIG. 3 is a plan view of the third layer or top layer of the assay cartridge, showing its rectangular openings and its other holes.
Figure 4:
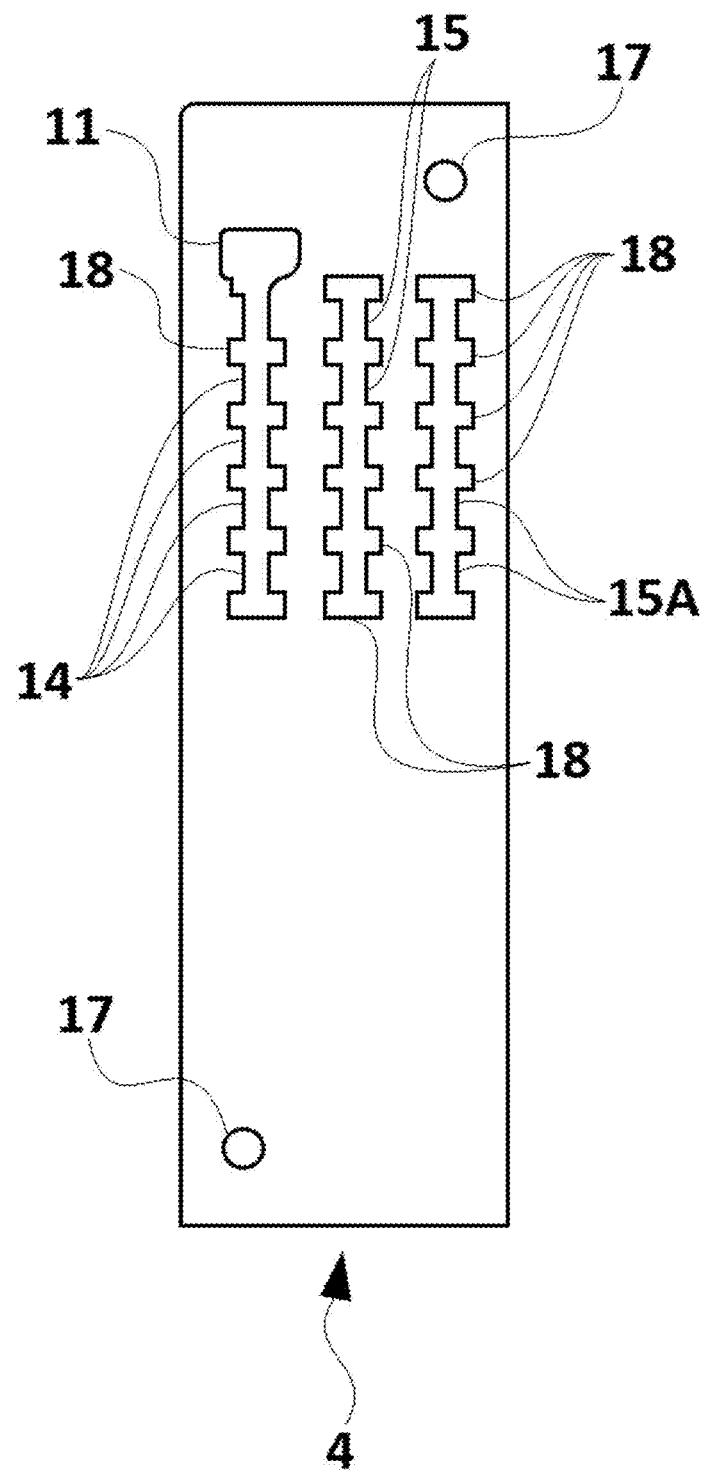
FIG. 4 is a plan view the second layer or middle layer of the assay cartridge, showing its wells and rectangular openings between wells.
Figure 5:
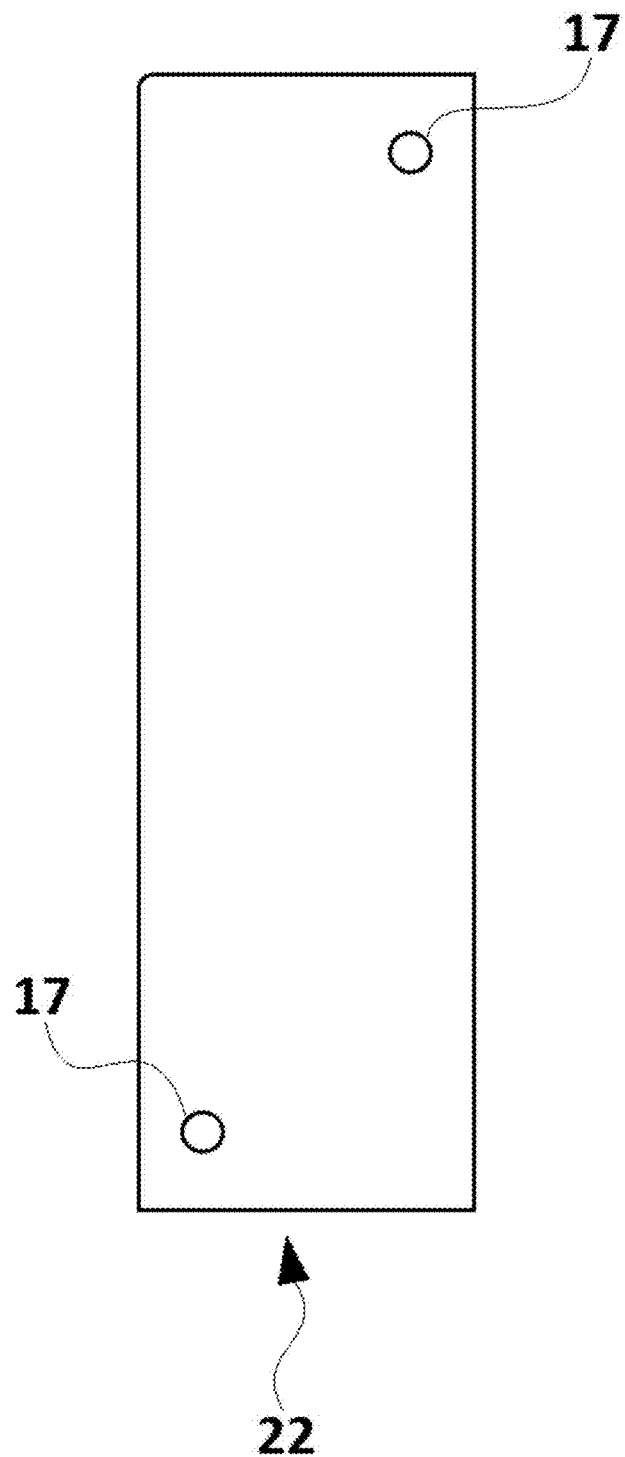
FIG. 5 is a plan view the first layer or bottom layer of the assay cartridge, showing its registration holes.

It should be understood that the drawings and the associated descriptions below are intended only to illustrate one or more embodiments of the present invention, and not to limit its scope. The drawings are not necessarily to scale.

DETAILED DESCRIPTION

The term "antibody" includes polyclonal and monoclonal antibodies whether murine, rat, chimeric, humanized or human antibodies, as well as antibody fragments including Fab, Fab', F(ab)'2, and Fv fragments, and antibody derivatives including single domain antibodies; helix-stabilized antibodies (see, e.g., Arndt et al., J Mol Biol 312: 221-228 (2001); diabodies; single-chain antibody molecules ("scFvs," see, e.g., U.S. Pat. No. 5,888,773); disulfide stabilized antibodies ("dsFvs", see, e.g., U.S. Pat. Nos. 5,747, 654 and 6,558,672), domain antibodies (see, e.g., Holt et al., Trends Biotech 21 (11): 484-490 (2003), Ghahroudi et al., FEBS Lett. 414: 521-526 (1997), Lauwereys et al., EMBO J 17: 3512-3520 (1998), Reiter et al., J. Mol. Biol. 290: 685-698 (1999), Davies and Riechmann, Biotechnology, 13: 475-479 (2001)) and bi-specific antibodies.

The term "antigen" is any protein, peptide, nucleic acid, or other biological and chemical entities, and including aptamers, antigens and epitopes, whether naturally-occurring (e.g., antigens from any mammal, including humans) as well as non-naturally occurring.

The term "binding agent" includes antibodies and fragments and derivatives of antibodies, aptamers, as well as any other biological and chemical entities which bind antigens.

The term "magnetic beads" refers to bead-shaped objects of any size (including microbeads) and composition which can be attracted or repulsed by a magnetic force, including objects containing paramagnetic materials or magnetizable materials, such as conductors, and including conductive metals.

Some hydrogels have a melting temperature (i.e., transition from solid to liquid) higher than their gelling temperature (i.e., transition from liquid to solid)—which is known as hysteresis. The preferred hydrogels for addition to the cartridge wells (to inhibit migration of reagents among wells and into channels during cartridge transport) are selected such that the hydrogel-reagent solution has a melting temperature (following gelling) above that encountered during shipment. Melting of the gelatin (i.e., failure to maintain a gel) could result in intermingling of materials in the wells during shipment. During manufacturing, the hydrogel-reagent solution is preferably heated to melting so that reagent solutions can be conveniently placed or injected into the wells of the cartridge in liquid form, followed by cooling to solidify it, before shipment. Among factors affecting the melting/gelling temperature is the concentration of the gelatin in the solution—where a higher concentration is associated with a higher melting and gelling temperature.

In one embodiment, the hydrogel-reagent solution melts below room temperature (RT), so the cartridge can be shipped at refrigeration temperature (4-10° C.), and then warmed to RT just prior to beginning the assay. However, such characteristics are difficult to achieve. Instead, suitable hydrogel-reagent solutions were made with a melting temperature at about 32° C. and a gelling temperature slightly above the range of refrigeration temperatures (around 15° C.). With these solutions, after heating to melting once and loading the assay wells, the temperature is reduced to about 4° C. to cause gelling of the hydrogel-reagent solution. The cartridge is preferably stored and shipped at 4-10° C. (which is typically a suitable temperature for storage of assay reagents), and the hydrogel-reagent solution remains gelled during shipment. Because the melting temperature is about 32° C., the cartridge can tolerate temporary temperature excursions (even up to RT, or 25° C.) and maintain the gel state. Before the assay is run, the hydrogel-reagent solution must again be heated to melting. The melting temperature should be low enough to not negatively affect reagent chemistry or assay performance.

The Bloom number is a measure of the gel strength of gelatin, reflecting the average molecular weight of its constituents. Gels in commerce can range up to 300 Bloom. Gels in foods usually range from 125 to 250 Bloom. Preferred gelatin hydrogels for use in the invention include relatively high Bloom at 1% concentration, as such higher Bloom numbers were found to provide better control over melting and gelling points.

An embodiment of assay cartridge 10 suitable for use with assay device 100 is shown in FIGS. 1-7. Other assay cartridges such as those in U.S. Pat. Nos. 9,528,985; 10,252, 268; and 10,126,297 (all incorporated by reference) can also be used with assay device 100, as can any and all components of the assay systems described therein, including those for controlling the driving systems and conducting assays, and recording and transmitting assay results as described therein; as well as any of the examples and variations of the various systems described therein.

Assay cartridge 10 is preferably made of a transparent material, including polystyrene, polypropylene, polytetrafluoroethylene ("Teflon®"), fluorinated ethylene propylene, polycarbonate or preferably polyethylene and acrylic. Acrylic layers are preferably cut through to generate the features, such as wells and channels, shown in FIGS. 1 to 7. Assay cartridge 10 consists of cover layer (layer 4) 20, upper layer (layer 3) 3, middle layer (layer 2) 4 and bottom layer (layer 1) 22. A cover layer 20, preferably formed of a flexible, transparent polymer such as polyethylene, is preferably adhered to the upper side of upper layer 3 (which is preferably coated with adhesive), and helps secure well contents for shipment of cartridge 10. Middle layer 4 has adhesive on each side, so it can be adhered to upper layer 3 and bottom layer 1 22 to assemble such layers of cartridge 10.

Cover layer 20 has a series of mini-holes 9, which each align with an opening 19 in upper layer 3, to allow access from openings 19 to ambient, in order to provide air pressure control in the air gaps formed by openings 19 and the aligned openings 18 in middle layer 4. Middle layer 4 has at least two channels, or connected rows of wells (and preferably three channels as shown), with the first well in the first channel labeled 11, and the remaining wells in the channel with well 11 all labeled 14. The wells in the next channel are all labeled 15 and the wells in the last channel are all labeled 15A. Each well in each channel is separated by an opening 18. All wells (11, 14, 15, 15A) are preferably less than 2 mm in depth, and more preferably about 1.5 mm in depth.

Preferably, a sample is added to well 11 through the hole 23 at the top left of cover layer 20, which aligns with the hole 16 at the top left of upper layer 3. Well 11 is slightly larger than the other wells and has an additional air vent 16A (aligning with hole 23A in cover layer 20) to relieve air pressure during sample loading. Reagent, control and magnetic beads, as well as reagents, are added to particular wells as desired, through one or more of holes 13 in upper layer 3, before cover layer 20 is adhered to upper layer 3. Preferably, control solution is also added in this manner to the terminal wells among channels 15 and/or 15A (i.e., the well in each of channel 15 and/or 15A which is aligned with well 11).

Assay cartridge 10 also carries an identifying one-dimensional or preferably two-dimensional barcode or other readable code 21, preferably on upper layer 3 or cover layer 20, to provide an identification code for assay cartridge 10. Code 21 can be seen on top of cartridge 10 or through transparent cover layer 20. This identifying code could also be provided on one or more of the other layers of assay cartridge 10. It is decoded, as described below, before conducting an assay.

Bottom layer 22 adheres to the lower side of middle layer 4 and closes the lower side of wells 11, 14, 15, and 15A and openings 18. Cover layer 20, upper layer 3, middle layer 4 and bottom layer 22 also include registration holes 17 to aid in alignment of the four layers on a template (not shown) having posts at the positions of registration holes 17, during assembly.

Figure 6:
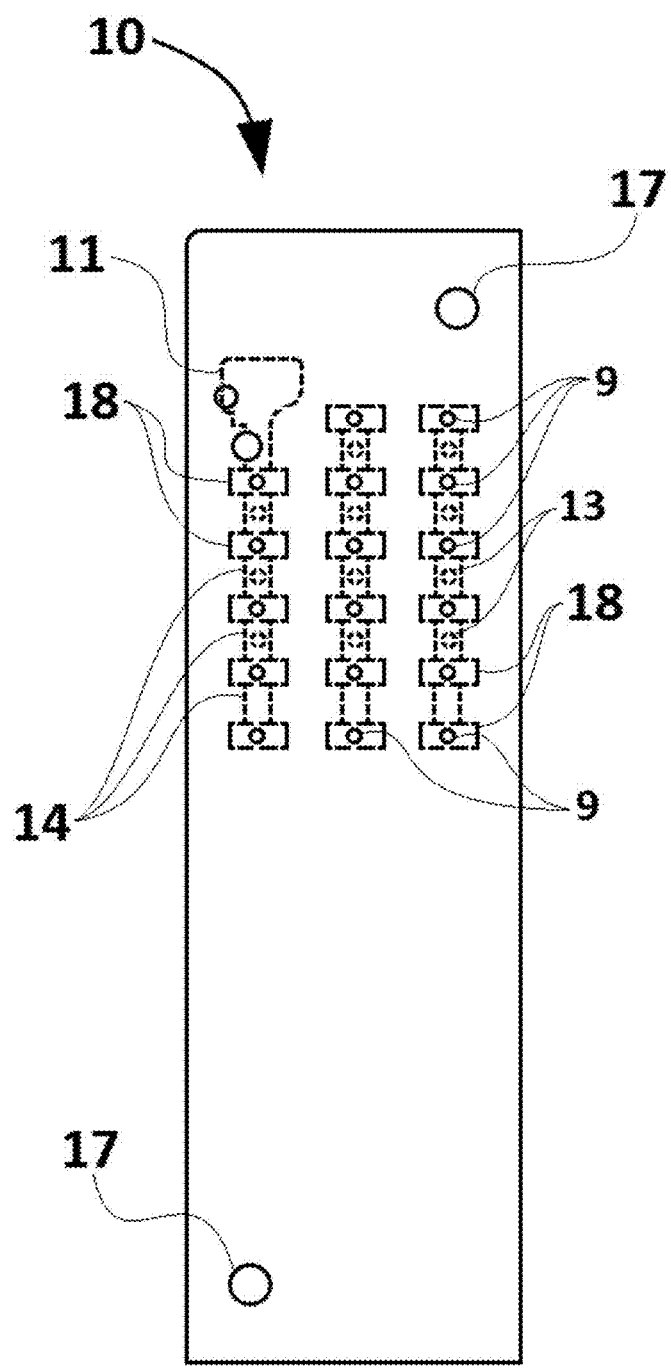
FIG. 6 is a plan view of the assay cartridge with the layers in place.
Figure 7:
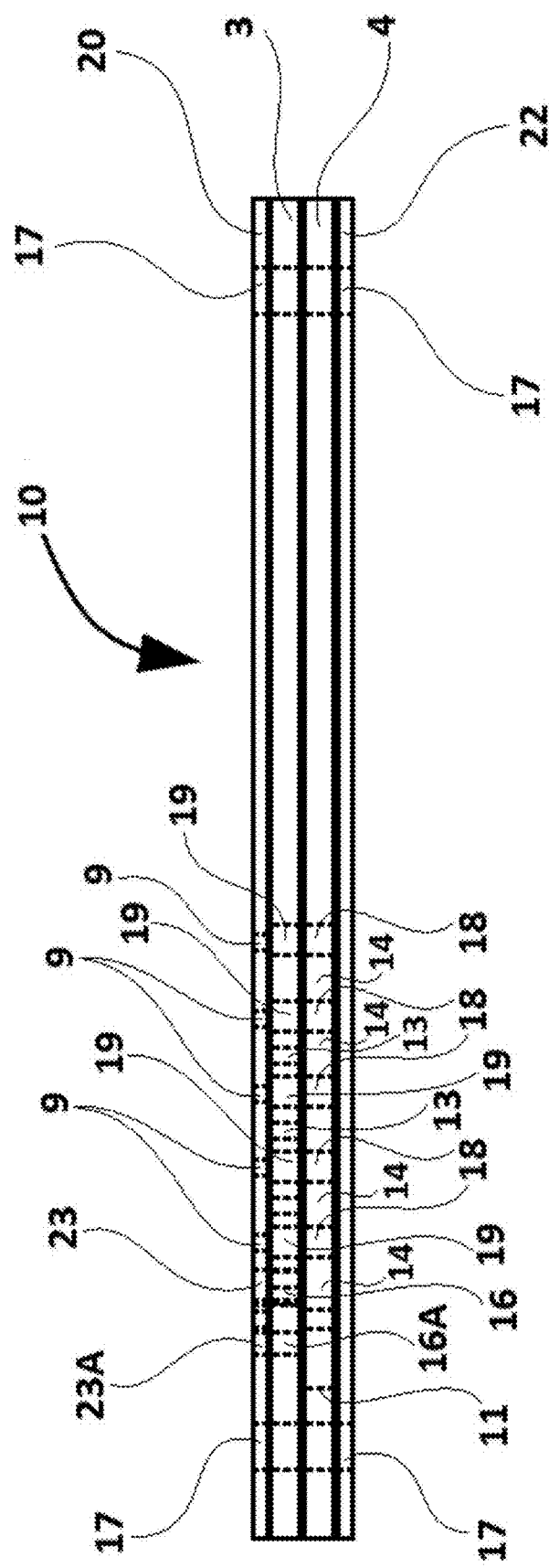
FIG. 7 is a cross-section of the assay cartridge where the thickness of the cover layer and lower layer is less than that shown (this and other drawings are not to scale).
Figure 8:
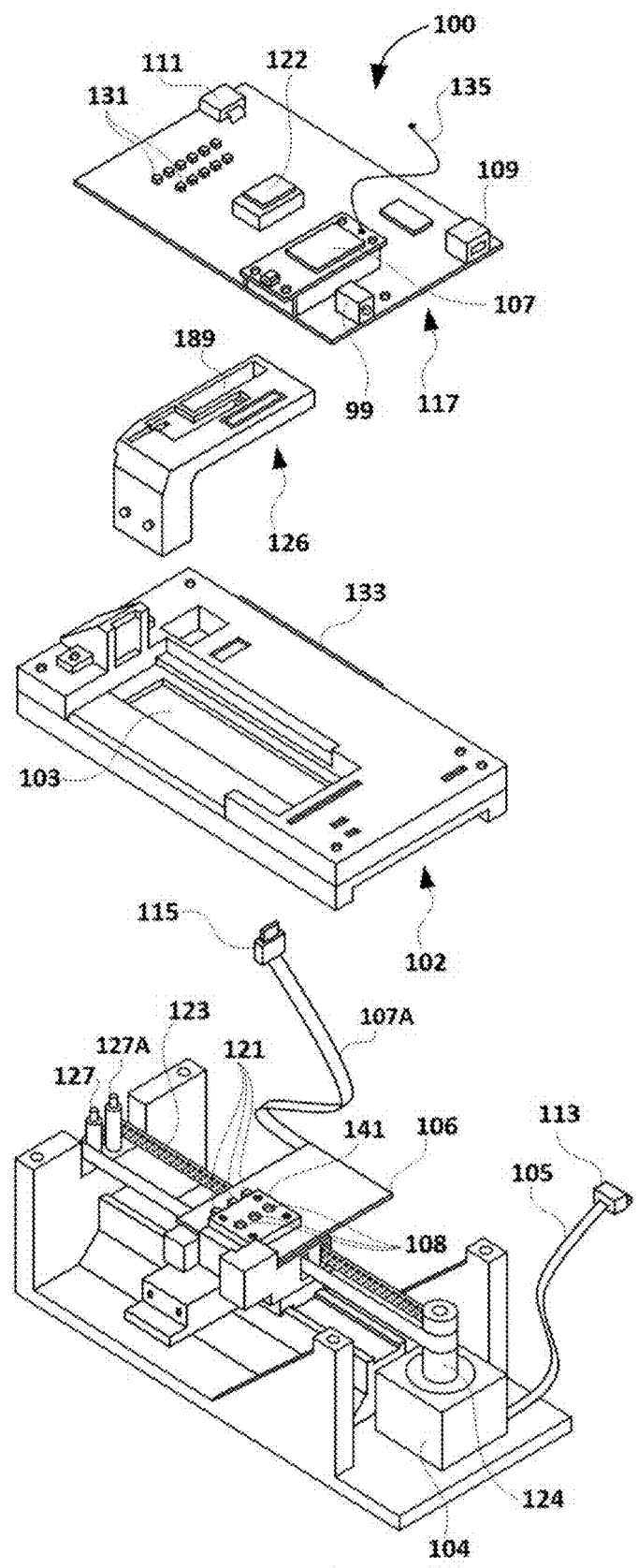
FIG. 8 is an exploded view of an assay driver for the assay cartridge, showing the driving mechanism, the cartridge holder, the circuit board which holds the controlling microcomputer and the bracket holding the upper set of magnets.
Figure 9:
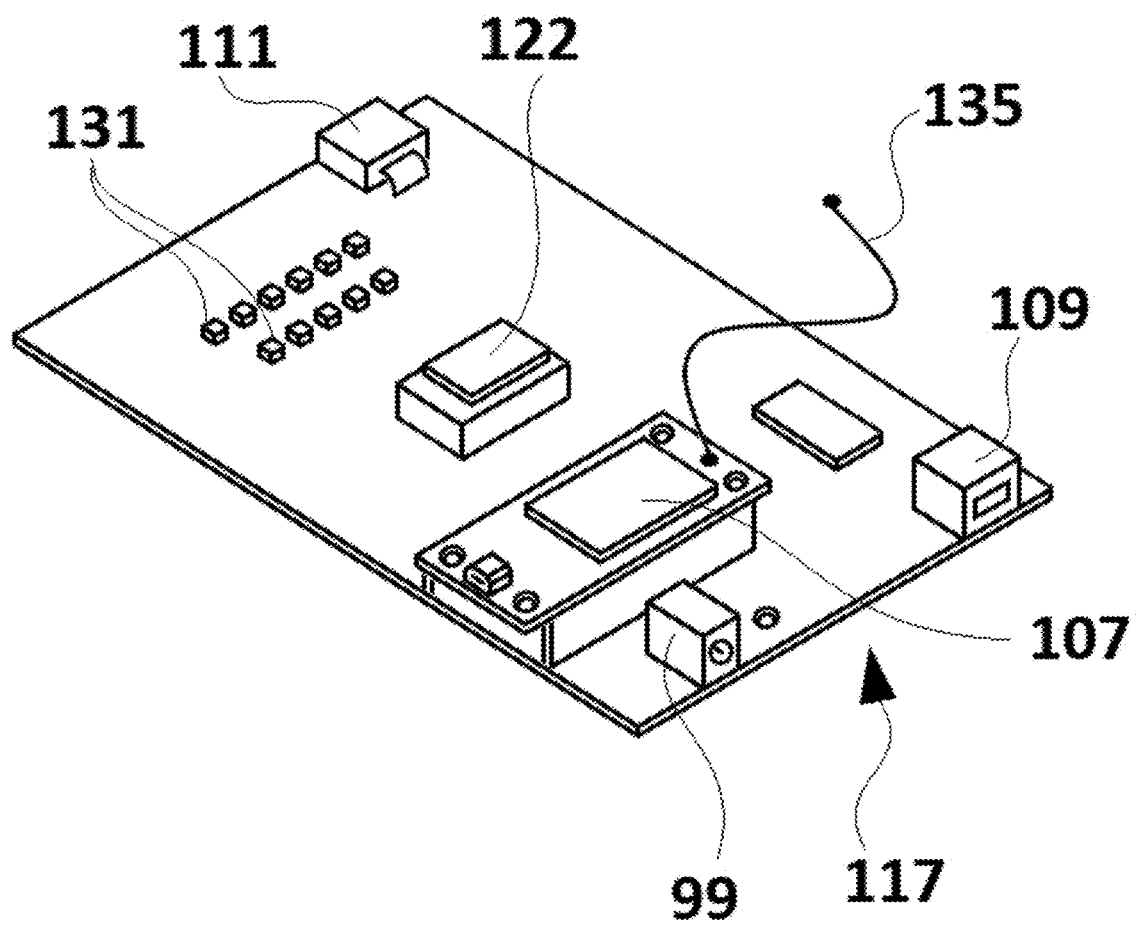
FIG. 9 is a perspective view of the circuit board which holds the controlling microcomputer.
Figure 10:
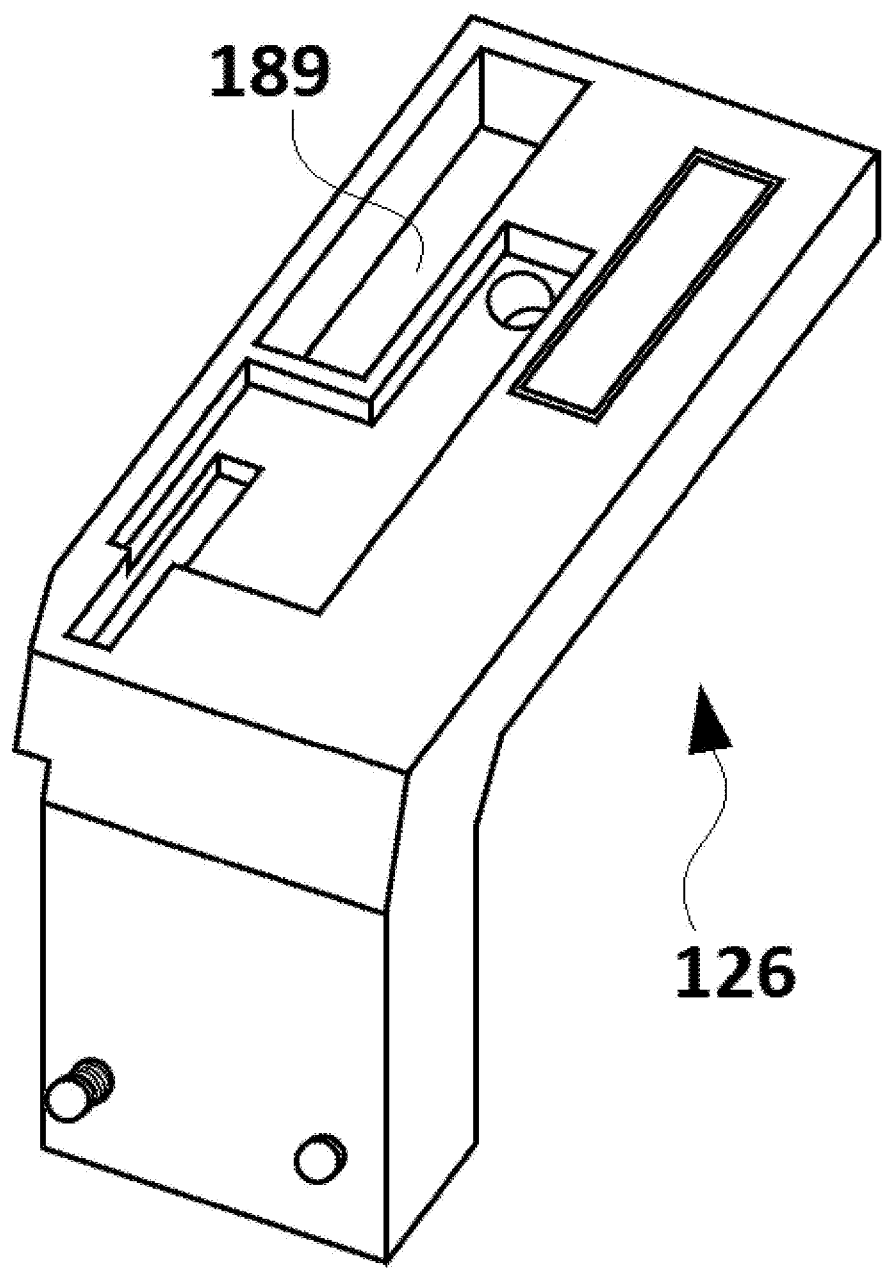
FIG. 10 is a perspective view from one side of the bracket which holds the upper set of magnets (not shown).
Figure 11:
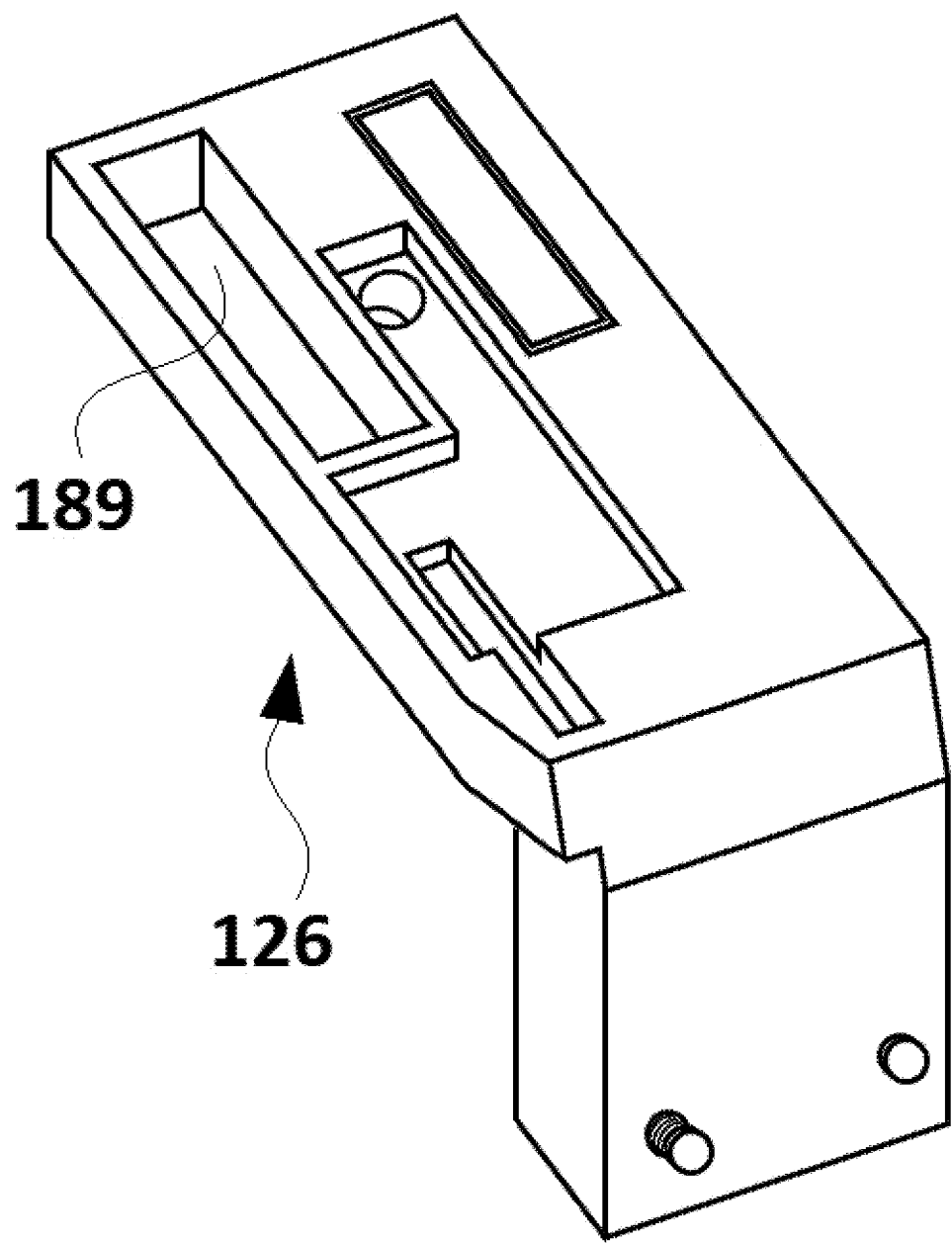
FIG. 11 is a perspective view from the other side (from that shown in FIG. 10) of the bracket.
Figure 12:
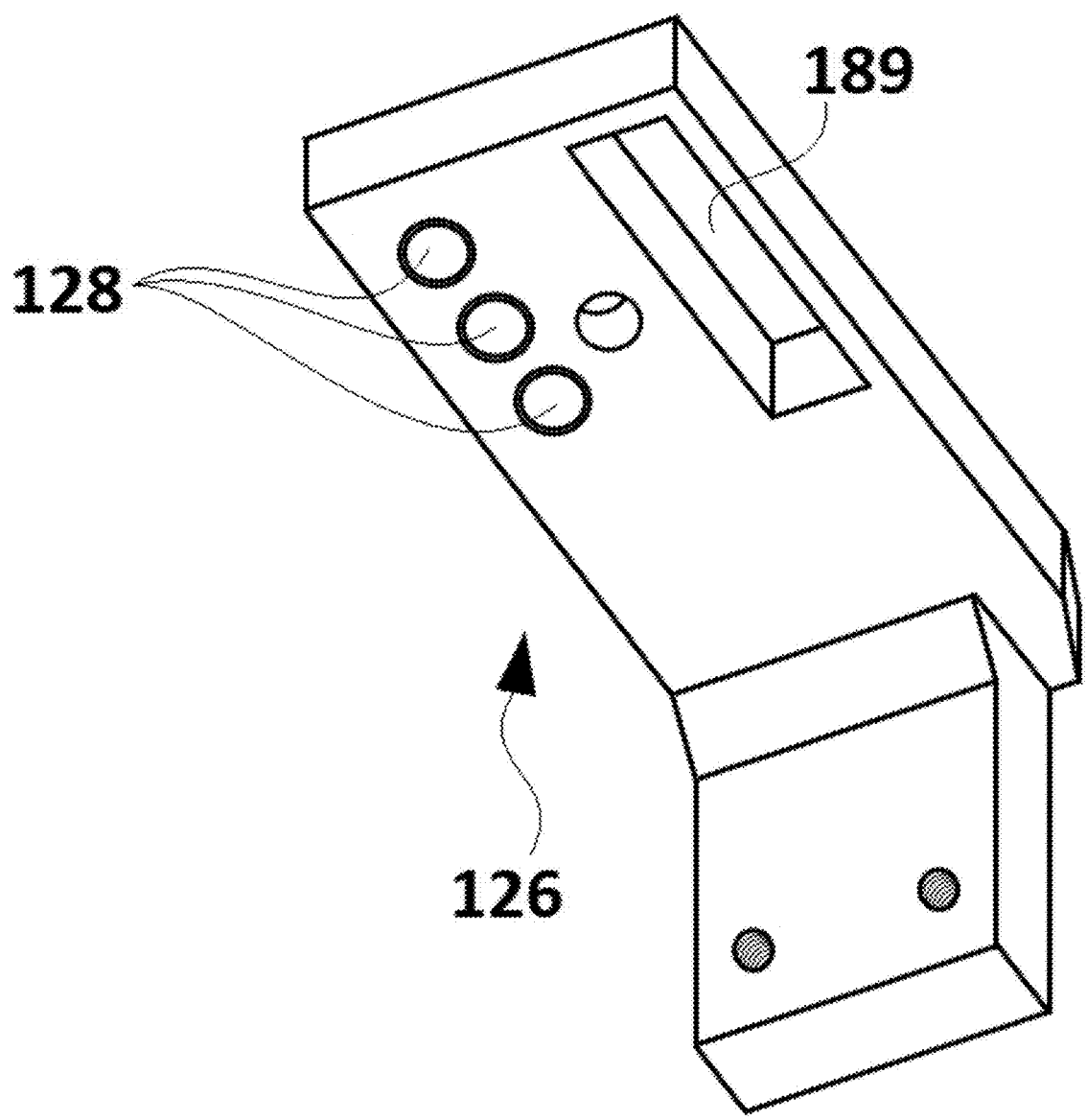
FIG. 12 is a perspective view of the underside of the bracket holding the upper set of magnets.
Figure 13A:
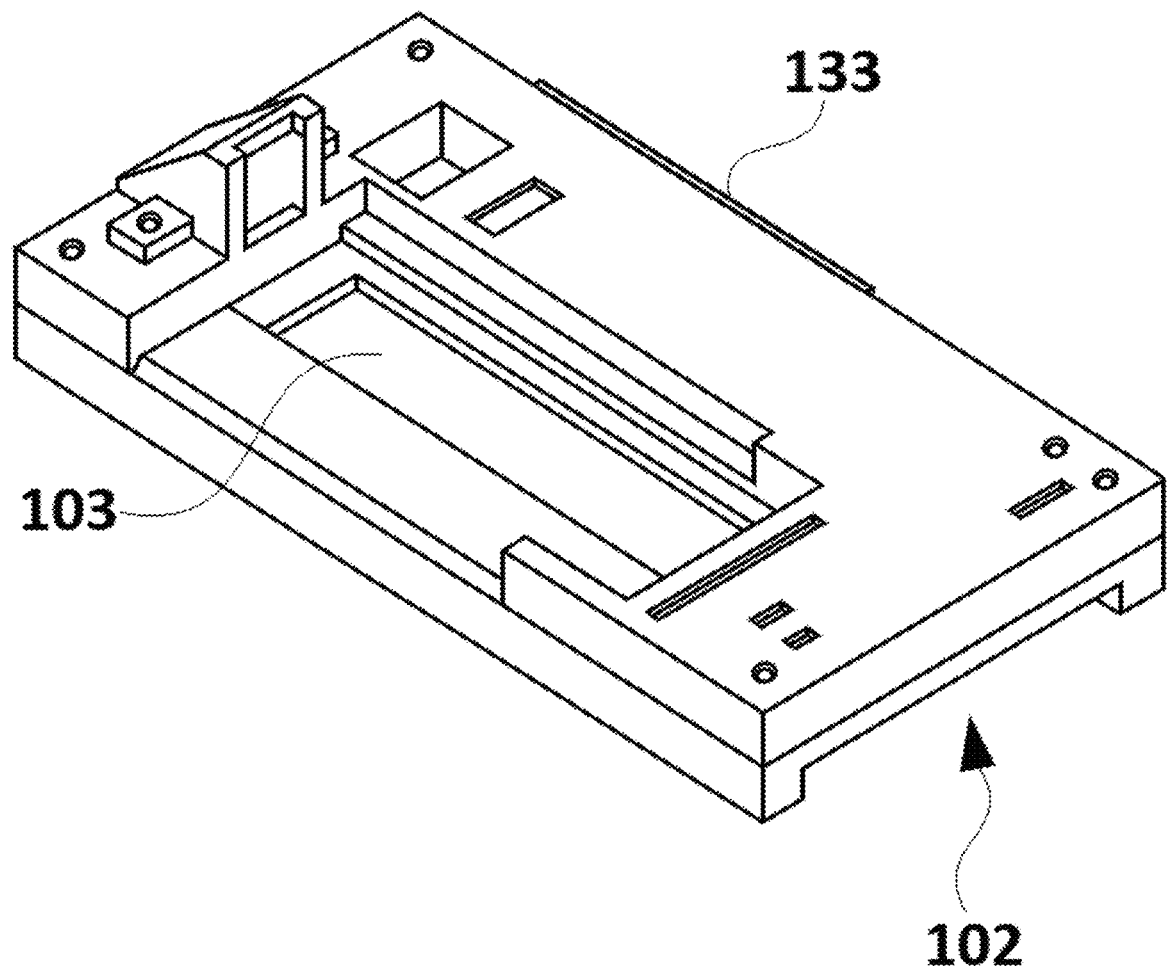
FIG. 13A is a perspective view of the cartridge holder.
Figure 13B:
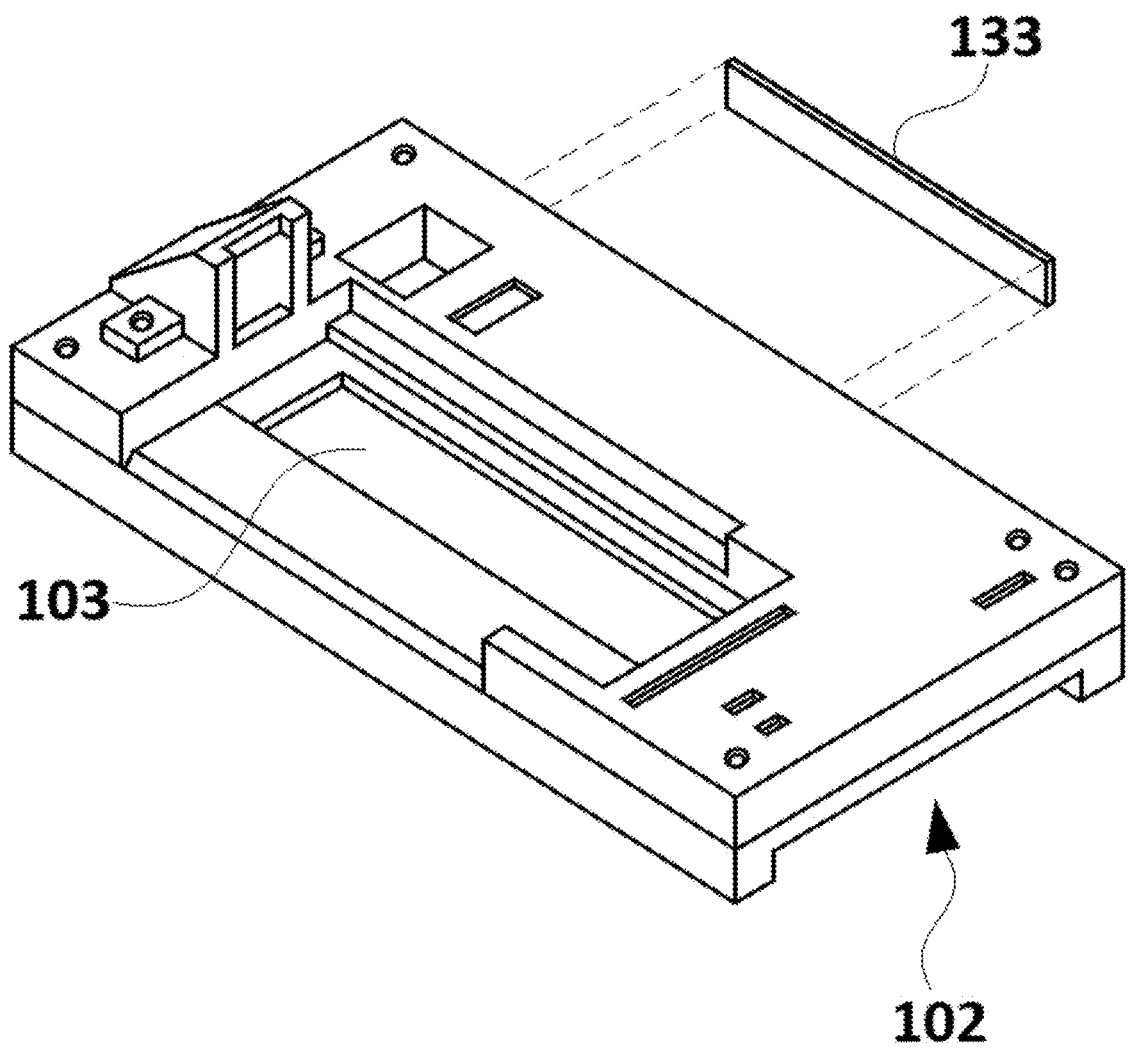
FIG. 13B is a perspective view of the cartridge holder with the antennae exploded.
Figure 14:
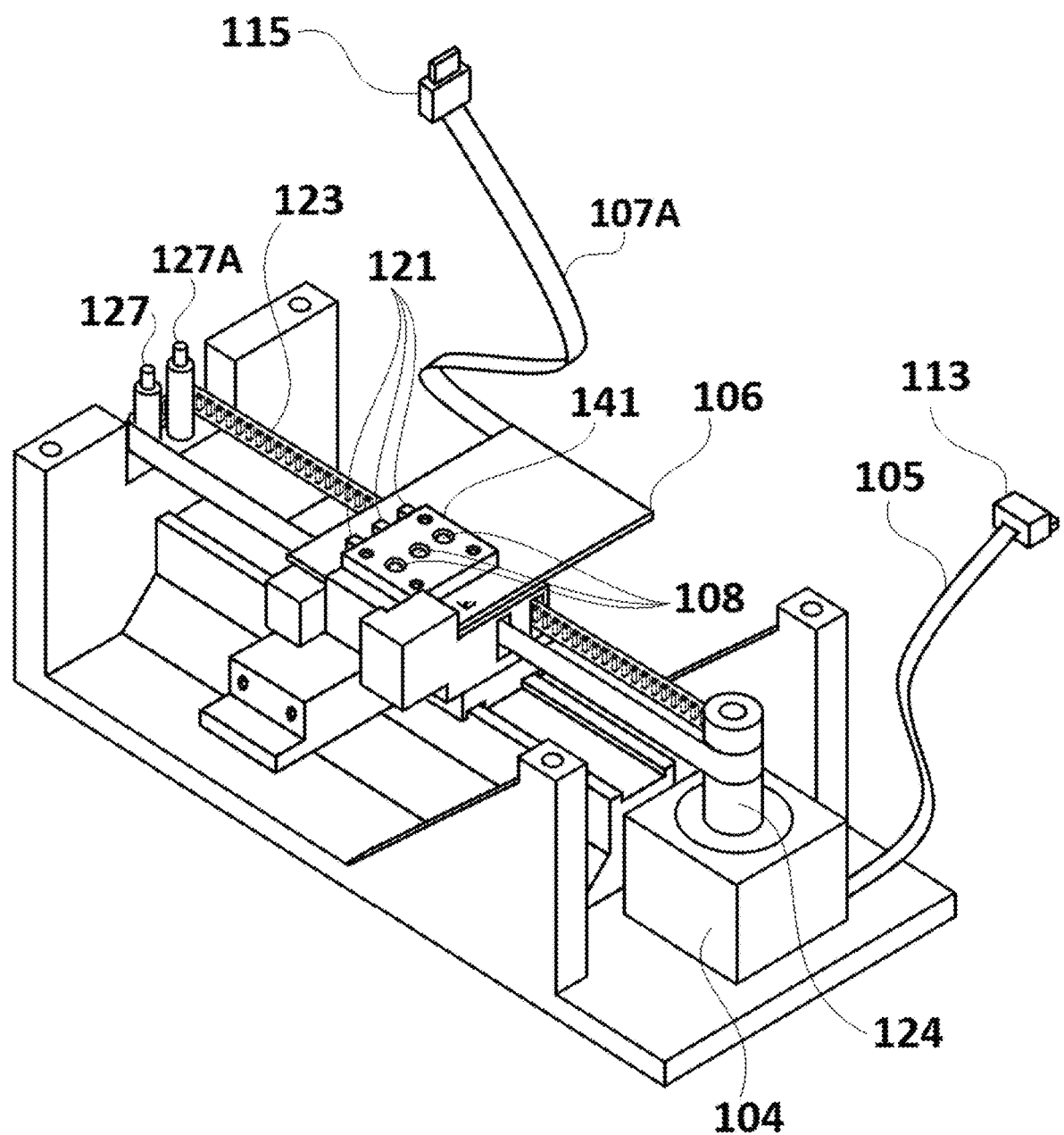
FIG. 14 is a perspective view of the driving mechanism for the assay driver.
Figure 15:
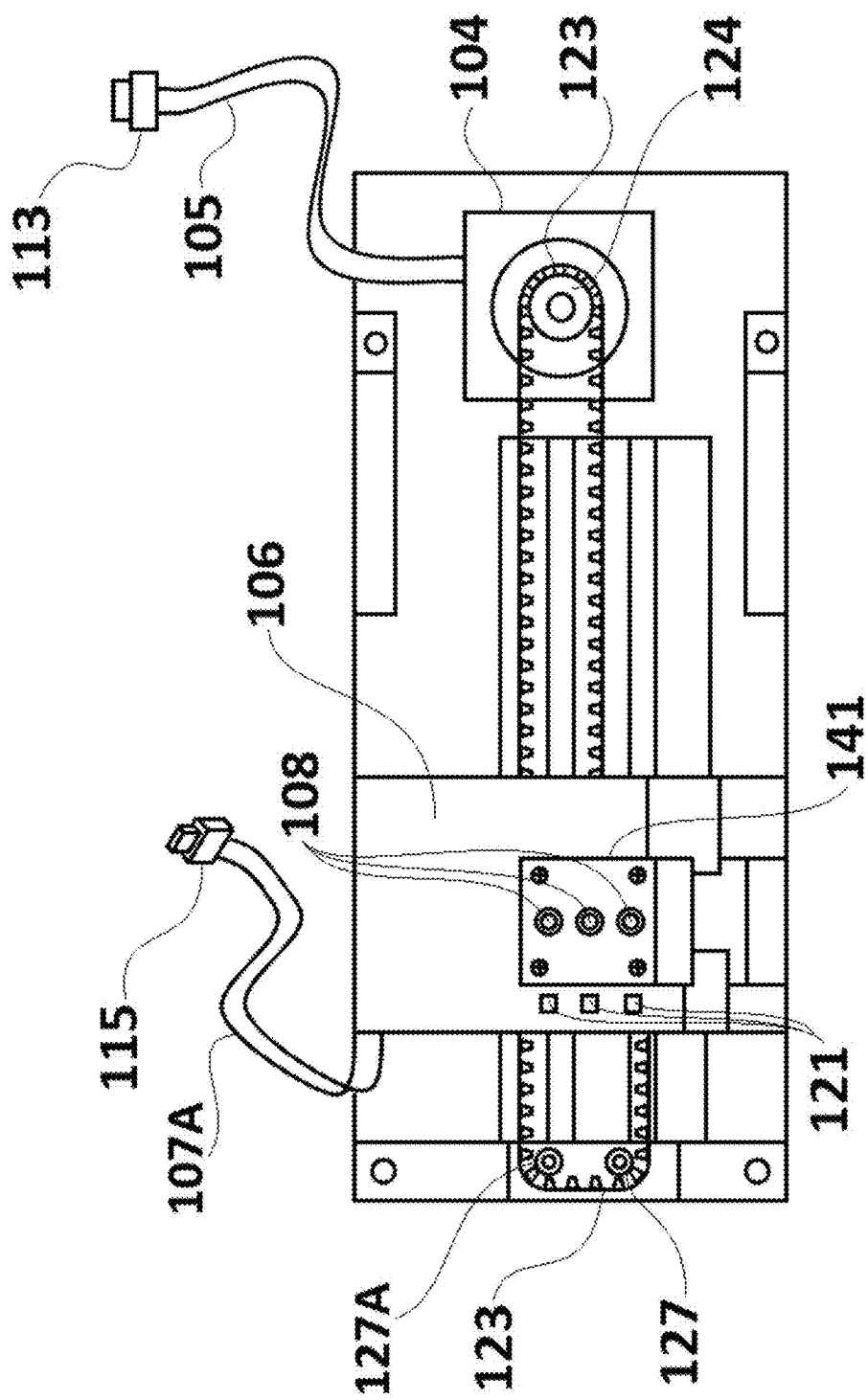
FIG. 15 is a plan view of the driving mechanism with the circuit boards and upper magnet bracket removed.
Figure 16:
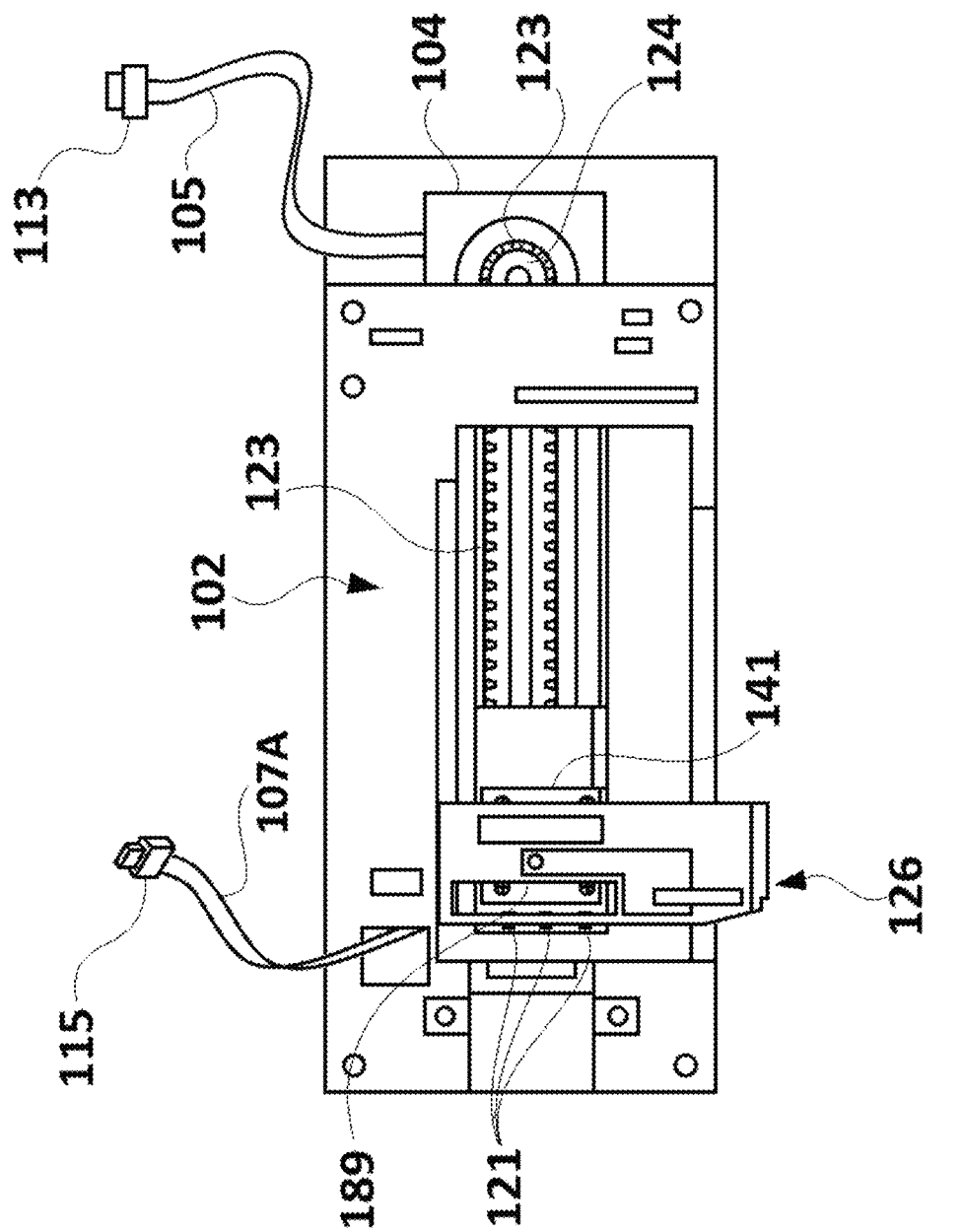
FIG. 16 is a plan view of the fully assembled assay driver with the circuit boards removed.
Figure 17:
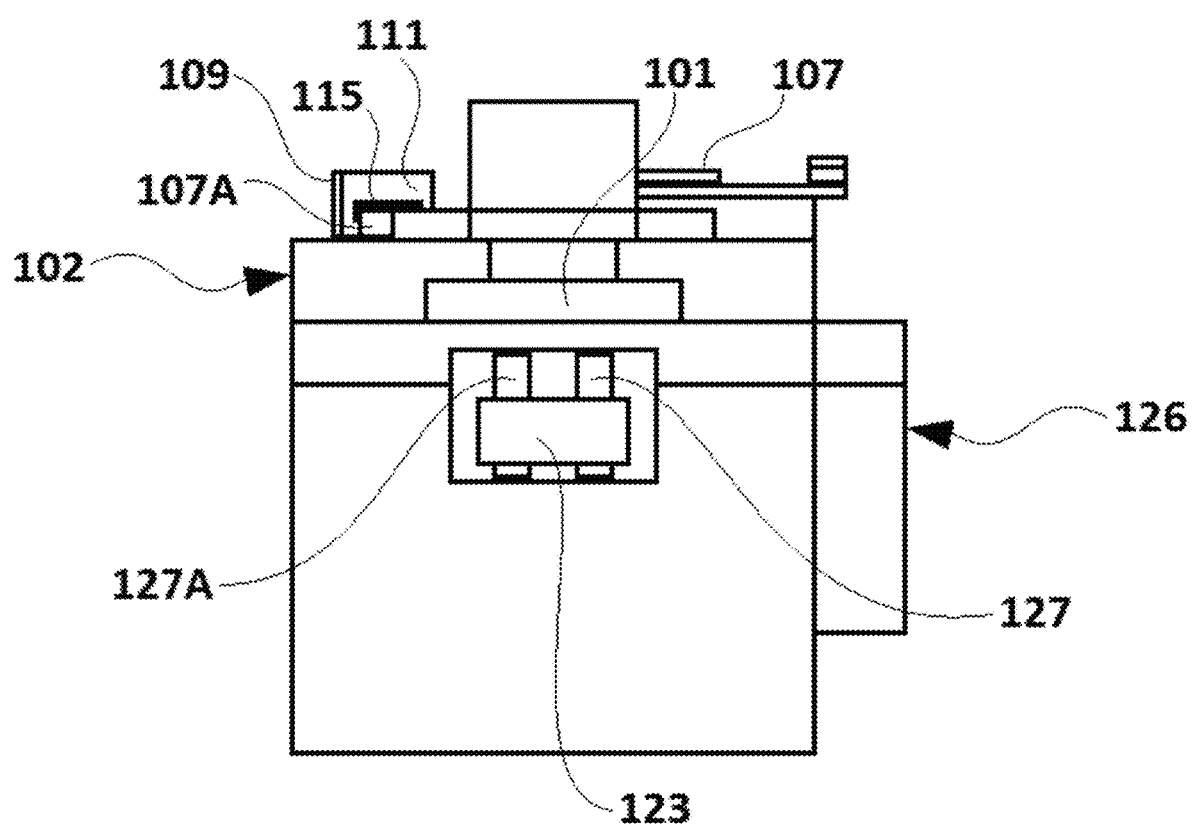
FIG. 17 is an elevational view, from the front, of the assembled assay driver.
Figure 18:
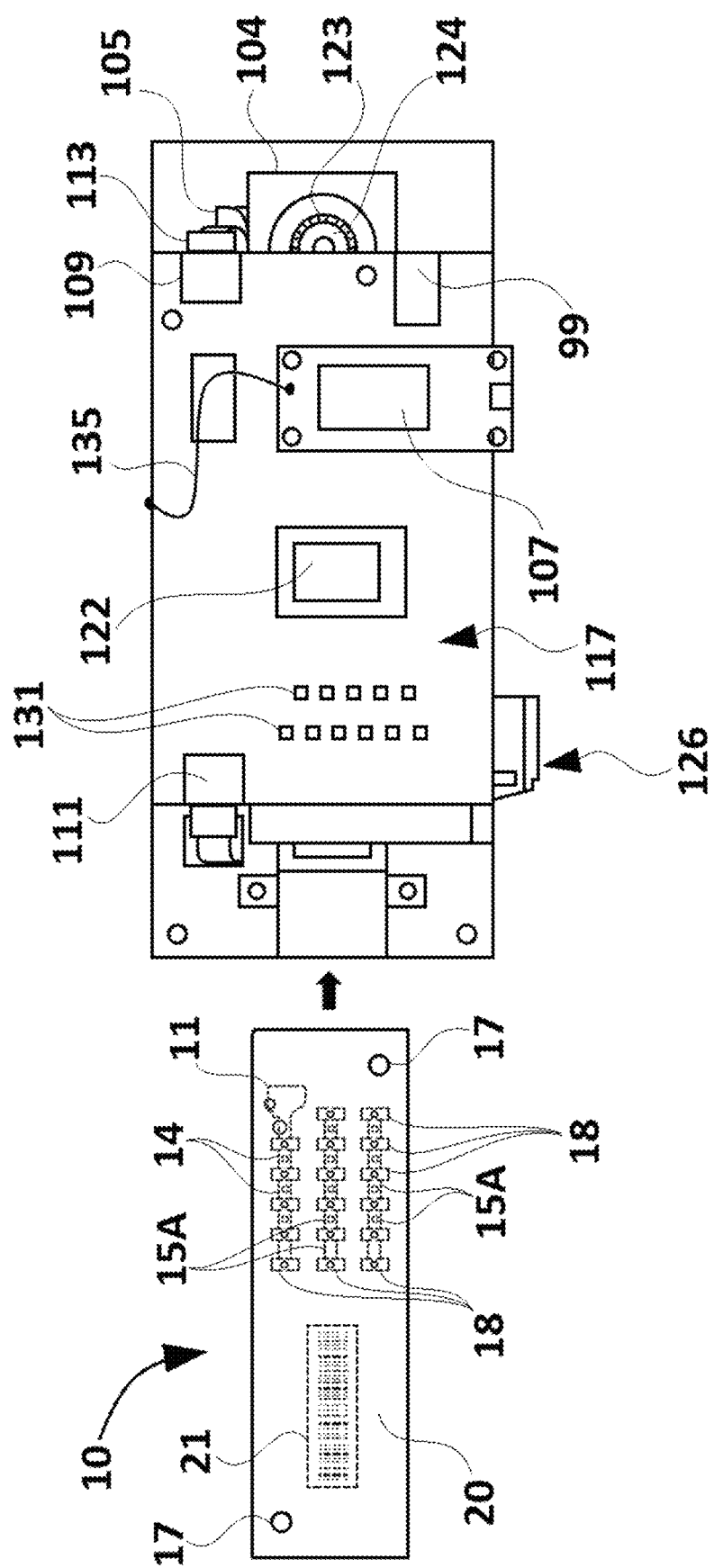
FIG. 18 is a plan view of the assembled assay driver and a cartridge in position for insertion into the assay driver.

A first embodiment of the assay device of the invention is illustrated in FIGS. 8-18. Assay driver 100 comprises a driving box cover 102 with a slot 101 for inserting a cartridge 10 and a linear actuator (in this case an electric motor 104, pulley 124, and timing belt 123). Linear actuator moves a platform 106, which holds lower magnets 108, which are preferably permanent and spherical in shape. Referring to FIGS. 6 and 7, a fully loaded assay cartridge 10 is inserted into slot 101 for scanning and processing. The term "fully loaded assay cartridge" designates an assay cartridge 10 which includes all materials needed for completing an assay, including: a sample ready to be analyzed and/or a control, as well as assay reagents and magnetic beads.

Cartridge holder 102 includes opening 103 which is positioned above cartridge 10, when it is held in slot 101. Ribbon wire 105 connects motor 104 to plug 109 through connector 113. Microcomputer 107 is connected with plug 109 and provides precise driving instructions, and timing thereof, to motor 104, where the instructions are provided following decoding of barcode 21 (to initially identify cartridge 10).

Board 117 preferably is connected to an AC-to-DC converter for connecting with a power source through port 99, to provide DC power for all components including microcomputer 107. The AC-to-DC converter receives AC power supply from domestic AC power source (for example, 110V, 60 Hz AC in the USA; or other AC power specifications in other countries) through a power cord and provides a reduced or 12V DC supply at its output ports.

Ribbon wire 107A connects platform 106 to microcomputer 107 through connector 115, which connects with plug 111 (which is connected to and receives instructions from microcomputer 107). LEDs 121 on platform 106 receive on/off instructions through wire 107A from microcomputer 107, and wire 107A also preferably transmits instructions for a heater 141 on platform 106 to heat cartridge 10. The heater 141 preferably does not heat cartridge 10 to where it negatively affects reagent chemistry or assay performance.

Circuit board 117 also includes a bar code reader 122, allowing reading the code 21 to identify the loaded assay cartridge assembly 10, when it is placed in slot 101. Microcomputer 107 preferably has direct access to cellular service; and/or, circuit board 117 may further include a WiFi or a cellular communications module for connection of the microcomputer 107 to a device accessing the internet, so as to communicate with a remote server, sending decoded code 21, returning instructions for controlling linear actuator 104 to microcomputer 107, sending results of assay to server, and sending or receiving other information. An antennae 133 is provided to connect with microcomputer 107 through wire 135.

Optional external inputs to microcomputer 107 from external memory devices (such as flash memories) are connectable to the microcomputer 107 through ports (such as USB ports, not illustrated), and can be included. Further, wireless inputs (for example, to receive instructions from a remote server; or to wirelessly transmit data generated by assay driver 100, such as color changes in the assay cartridge 10) can also be provided for microcomputer 107.

Circuit board 117 includes optical sensors 131 which scan the aligned wells of cartridge 10, during an assay.

Bracket 126, with viewing slot 189, is attached to platform 106 and holds upper magnets 128, which are preferably permanent and truncated cylinders (discs) in shape. Magnets 128 are positioned above opening 103 when bracket 126 is attached to platform 106, to provide unobstructed access for the magnetic field from magnets 128 to cartridge 10. Lower magnets 108 reside below cartridge 10 during an assay; they are carried by platform 106.

Magnets 108 and 128 should not be more than 5 mm, and preferably within 0.5 mm from the surface of cartridge 10. At such distances, magnets of the same general shapes as magnets 108 and 128 were found most effective in moving magnetic beads from well to well and in improving mixing of beads and reagents in wells. See Example II below.

Magnets 108 and 128 can be iron, iron alloys, rare earth elements or alloys, ceramic (or ferrite) magnets, made of a sintered composite of powdered iron oxide and barium/strontium carbonate ceramic, and/or an AlNiCo magnet. The alloys can include one or more of: $Nd_2Fe_{14}B$ (neodymium, preferably), $SmCo_5$, $SmCo_7$, $SmFe_7$, $SmCu_7$ and $SmZr_7$. Magnets 108 and 128 can also be an injection-molded magnets which are a composite of various types of resin and magnetic powders, or polymeric; e.g., using a high-coercivity ferromagnetic compound (usually ferric oxide) mixed with a plastic binder. Magnets should be in the same orientation, sized by diameter to minimize interference between adjacent magnets and to have the majority of the magnetic field directed at the target well (one of wells 11, 14, 15, and 15A) for a particular magnet, and not at other wells.

In assay operation, microcomputer 107 executes its instructions and selectively actuates linear actuator 104 to rotate pulley 124 clockwise or counterclockwise, at particular intervals. Timing belt 123 is notched along its length to mesh with gears on pulley 124 (itself attached to the spindle of motor 104) and/or on opposing bushings 127 and 127A, which are not actively rotated but rotate freely. In the embodiment shown, the ends of timing belt 123 are fixed to platform 106, so it moves bi-directionally depending on the direction of rotation of pulley 124.

Example 1

Performing an ELISA Immunoassay

Prior to running an assay in cartridge 10, the barcode 21 is scanned (which is preferably done by scanner 122 at the time cartridge 10 is inserted; or done manually, with a separate scanner) and the scanned barcode information is sent to a server, which identifies the assay type and provides the instructions about the assay steps and their timing (preferably over the internet or cellular connection) to microcomputer 107. Alternatively, the instructions can be directly retrieved from the server and manually input or electronically fed into microcomputer 107.

If cartridge 10 is preferably pre-loaded with assay reagents which are held in place with hydrogel (see US Publ'n No. 2019/0091691, incorporated by reference) then the first step is for microcomputer 107 to execute instructions to activate heater 141 and heat the cartridge 10; or heating can be done in a separate incubator by the user.

In one example of an Enzyme-Linked ImmunoSorbent Assay (ELISA) run on assay cartridge 10 using device 100, a sample is introduced into well 11 (through the aligned hole 23 in cover layer 20). Preferably, control solution is pre-loaded in the terminal well of channel 15; and more preferably, another control solution is pre-loaded into the terminal well of channel 15A. Magnetic beads, preferably coated with antibody against the antigens of interest and in a buffer solution are preferably preloaded into the wells of each channel 14, 15 and/or 15A, which, (i) for channel 14, is the well 14 subsequent to the well adjacent to sample overflow area 11; and (ii) the well in channels 15 and/or 15A, respectively, which is aligned with that well in channel 14 which is specified in (i).

1. From there, during an initial step in the assay, the magnetic beads are moved into the well adjacent to sample overflow area 11, which contains the sample, and into the terminal well of channel 15 and/or 15A which contains the control, by selective activation of linear actuator driven by motor 104. When in such wells, the motor 104 oscillates pulley 124 which moves timing belt 123 which drives platform 106 containing magnets 108 and 128, which drive the vigorous mixing of the magnetic beads with the well contents.

2. Motor 104 next rotates pulley 124 to move timing belt 123 to drive platform 106 containing magnets 108 and 128 such that virtually all the magnetic beads are moved down their respective rows to the next well in channels 14, 15, and/or 15A which has not reacted with the magnetic beads yet. Another assay reagent is preferably reacted with the magnetic beads in each such well again, after motor 104 oscillates pulley 124 which moves timing belt 123 which drives platform 106 containing magnets 108 and 128, which drive the vigorous mixing of the magnetic beads with the well contents.

3. Motor 104 next executes instructions to rotate pulley 124 to move timing belt 123 to drive platform 106 containing magnets 108 and 128 such that all the magnetic beads are moved down their respective rows to the next well in channels 14, 15, and/or 15A which has not reacted with the magnetic beads yet. Such wells contain washing solution, preferably a buffer, which acts to wash the magnetic beads in each such well, after motor 104 oscillates pulley 124 which moves timing belt 123 which drives platform 106 containing magnets 108 and 128, which drive the vigorous mixing of the magnetic beads with the well contents.

4. Motor 104 next executes instructions to rotate pulley 124 to move timing belt 123 to drive platform 106 containing magnets 108 and 128 such that all the magnetic beads are moved down their respective rows to the next well in channels 14, 15, and/or 15A which has not reacted with the magnetic beads yet. Such wells contain color-producing reagents, used to quantify analyte levels in samples and controls in each channel. These wells preferably each contain a development solution for the label used. The color change can be accomplished with an enzyme-substrate combination, as described in U.S. Pat. Nos. 10,126,297 and 10,252,268.

5. Motor 104 next executes instructions to rotate pulley 124 to move timing belt 123 to move platform 106 such that all the magnetic beads are moved along their respective channels to a different well than the well in step 4 above. In such wells, the signal from each such well in channels 14, 15 and/or 15A is then determined by sensors.

6. The signal from each such well is measured by the sensors 131 and transmitted to a server by microcomputer 107.

To ensure cartridge 10 is properly oriented, slot 101 preferably includes internal features to allow insertion of cartridge 10 in only the correct orientation. Once properly positioned, or preferably, once detected by the microcomputer 107 as such, microcomputer 107 initiates performance of the assay steps in the correct sequence by moving the magnetic beads as described above. Platform 106 and bracket 126 move and carry magnets 108 and 128, respectively, which move and/or oscillate the magnetic beads in wells of channels 14, 15, 15A and which move the magnetic beads through openings 18.

Sensors 131 on circuit board 117, which read overall light intensity (preferably used with color filters) and/or intensity values may be used to show the chemiluminescence or color change, producing a quantitative result. Suitable sensors 131 include four-channel photoelectric color sensor, capable of sensing the total light signal and up to three color-filtered signals. Preferably, the sensor results or the scanned images are captured through sensors 131 and are transmitted (as instructed by microcomputer 107) to the server for interpretation, and/or to another authorized recipient or health care provider, and/or to the assay subject or his/her designees (including distribution to anyone who can receive the material under applicable HIPAA regulations).

LEDs 121 are also selectively actuated to enhance the intensity of the color produced by a positive reaction, and enhance the quality of the results.

As noted, for magnets 108 and 128, it was found that the optimal distance should not be more than 5 mm, and preferably within 0.5 mm from the surface of cartridge 10. In this embodiment, magnets 108 and 128 were neodymium permanent magnets of Br-max of approximately 4500 Gauss. Such magnets at such proximity provided a net magnetic field downwardly on the magnetic beads in the wells, whereby during the assay, the magnetic beads tend to move cleanly through the wells and the openings 18, under attraction by moving magnets 108 and 128.

Example II

Figure 19:
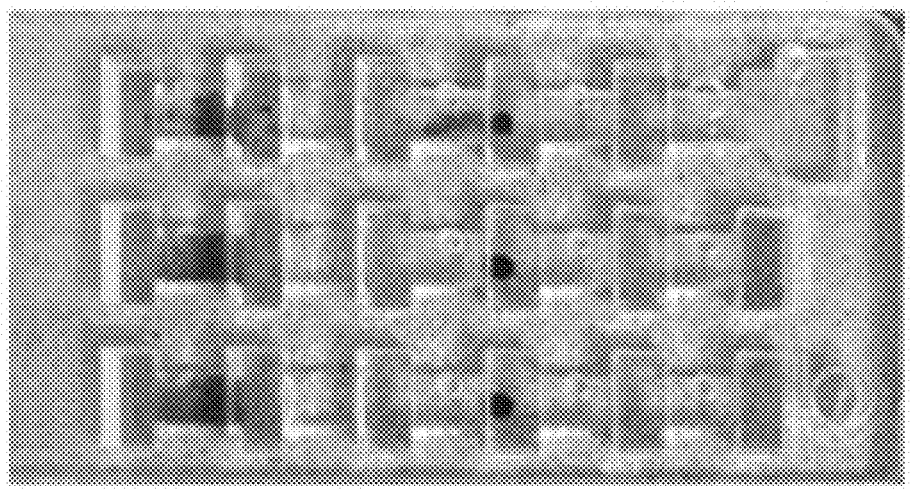
FIG. 19 are two images illustrating the results of mixing in a cartridge, where in the upper image, there was no upper magnet in the bracket aligned with the uppermost row; and in the lower image, there was no upper magnet in the bracket aligned with the middle row.
Figure 19:
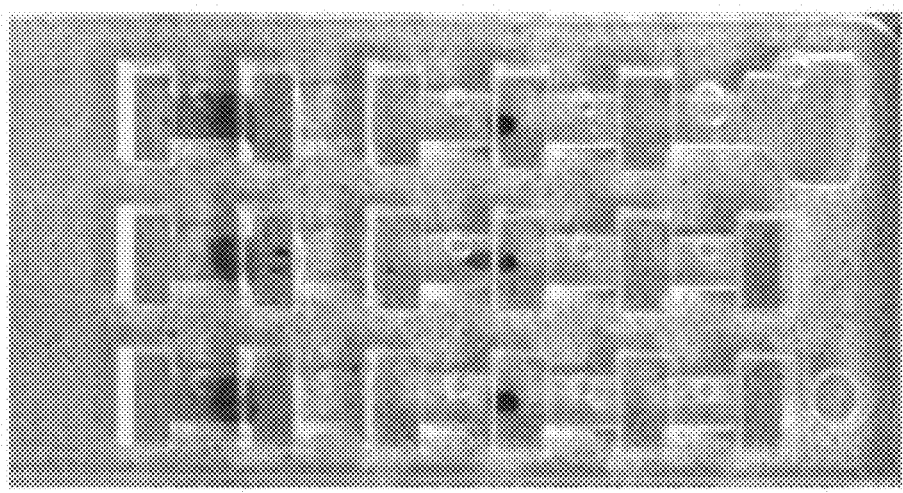

FIG. 19 depicts the results of an experiment showing the mixing of magnetic beads with well contents using the assay driver 100 and cartridge 10. In this experiment, magnetic beads conjugated with HRP were moved from the third well from the right to the fifth well from the right. This fifth well contains TMB (HRP substrate) that produces a blue color when it reacts with HRP. The magnetic beads are moved and oscillated in the same pattern by magnets 108, and in the lower two rows of the upper cartridge image, and in the two outer rows of the lower cartridge image, the beads are also moved and oscillated by an upper magnet 128. In the uppermost row of the upper cartridge image, and in the middle row the lower cartridge image, the upper magnet 128 aligned with such rows was removed from bracket 126.

As can be observed, where upper magnet 128 is present and aligned with particular rows, the blue dye in the fifth wells is evenly distributed, indicating more complete mixing of beads and well contents. In contrast, in the uppermost row of the upper cartridge image, and in the middle row the lower cartridge image, the regions of lighter color shows less complete mixing. These results demonstrate that having an upper magnet 128 aligned with a particular row, improves mixing and promotes bead motion in that row.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, any of the terms "comprising", "including", containing", etc. are to be read expansively and without limitation. The methods and processes illustratively described herein suitably may be practiced in differing orders of steps, and that they are not necessarily restricted to the orders of steps indicated herein or in the claims. It is also noted that as used herein and in the appended claims, the singular forms "a," "an," and "the" include plural reference, and the plural include singular forms, unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. An apparatus for performing an assay where magnetic beads are moved through a plurality of wells which contain assay reagents, comprising:
   an assay cartridge with upper and lower surfaces having at least one channel of wells parallel to the upper and lower surfaces, with the wells of said channel separated by air gaps, and magnetic beads contained in at least one well;
   a set of magnets for said channel, a first subset of said set of magnets are positioned between 0.5 mm and 5 mm above the upper surface and a second subset of said set of magnets are positioned between 0.5 mm and 5 mm below the lower surface is used to generate magnetic force perpendicular to the upper and lower surfaces; and
   a linear actuator configured to move the set of magnets parallel to the channel such that said magnetic beads move between wells of said channel, and additionally, said magnetic beads can be moved within a well to thereby mix said beads with the contents of a well.

2. The apparatus of claim 1, wherein the magnetic beads are conjugated to antibodies or antigens.

3. The apparatus of claim 1, wherein the first subset of magnets and the second subset of magnets are positioned coaxially to each other.

4. The apparatus of claim 1, wherein the linear actuator is configured to move the set of magnets intermittently.

5. The apparatus of claim 1, wherein the force exerted by the set of magnets on the magnetic beads is downward, in net.

6. The apparatus of claim 1, wherein some of the first subset of magnets are substantially cylindrical.

7. The apparatus of claim 1, wherein some of the second subset of magnets are substantially spherical.

8. The apparatus of claim 1, wherein the linear actuator is a motor attached to a pulley that drives a timing belt that is attached to the platform.

9. The apparatus of claim 1, wherein there are three channels of wells.

10. The apparatus of claim 1, wherein the cartridge is composed of four layers of polymer material.

11. The apparatus of claim 10, wherein the two outer layers of polymer material are polyethylene.

12. The apparatus of claim 10, wherein the two inner layers of polymer material are acrylic.

13. The apparatus of claim 10, wherein all four layers of polymer material have one or more registration guide holes.

14. The apparatus of claim 10, wherein the adjacent layers of polymer material are bonded with adhesive.

15. The apparatus of claim 1, wherein the assay cartridge has barcode encoding a unique identifier.

16. The apparatus of claim 1, further including sensors which can acquire data and/or intensity values from the assay cartridge.

17. The apparatus of claim 1 wherein the magnets are neodymium permanent magnets.

18. The apparatus of claim 1 wherein the magnets have Br-max of approximately 4500 Gauss.

* * * * *